(12) United States Patent
Tarpill

(10) Patent No.: US 6,253,641 B1
(45) Date of Patent: *Jul. 3, 2001

(54) SINGLE DROP TRIMMER WITH LIMITED CARTRIDGE RELEASE

(75) Inventor: Andrew J. Tarpill, East Haddam, CT (US)

(73) Assignee: Capewell Components Company, LLC, Cromwell, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/632,433

(22) Filed: Aug. 4, 2000

Related U.S. Application Data

(63) Continuation-in-part of application No. 09/265,437, filed on Mar. 9, 1999, now Pat. No. 6,128,976.

(51) Int. Cl.$^7$ ........................................ H02G 1/12
(52) U.S. Cl. ................ 81/9.44; 81/423; 81/9.4; 30/90.6
(58) Field of Search .............. 81/9.4, 9.41, 9.43, 81/9.44, 423; 30/90.1, 90.6, 91.1, 91.2

(56) References Cited

U.S. PATENT DOCUMENTS

| | | |
|---|---|---|
| 435,414 | 9/1890 | Fisher . |
| 1,165,176 | 12/1915 | Hornor . |
| 2,103,597 | 12/1937 | Ravenscroft . |
| 2,452,734 | 11/1948 | Costelow . |
| 2,725,774 | 12/1955 | Tekse . |
| 2,814,222 | 11/1957 | Sanders . |
| 3,596,541 | 8/1971 | Bieganski . |
| 3,600,983 | 8/1971 | Hendry . |
| 3,665,603 | 5/1972 | Bilbrey et al. . |
| 3,703,840 | 11/1972 | Kauf . |
| 3,864,828 | 2/1975 | Bilbrey et al. . |
| 4,070,930 | * 1/1978 | Oprins ................................ 30/90.6 |
| 4,159,582 | * 7/1979 | Ostrowski .......................... 36/67 D |
| 4,559,704 | * 12/1985 | Michael, III ....................... 30/90.1 |
| 4,594,029 | * 6/1986 | Michael, III ....................... 408/1 R |
| 4,829,671 | 5/1989 | Cheng . |
| 4,835,862 | 6/1989 | Phillips . |
| 4,953,293 | 9/1990 | Sterlacci . |
| 4,958,433 | 9/1990 | Persson . |
| 4,979,299 | 12/1990 | Bieganski . |
| 5,036,734 | 8/1991 | Morrow . |
| 5,050,302 | 9/1991 | Mills . |
| 5,113,727 | 5/1992 | Foster . |
| 5,150,522 | 9/1992 | Gwo-Jiang . |
| 5,206,996 | 5/1993 | McDaniel . |
| 5,381,601 | 1/1995 | Danter et al. . |
| 5,713,132 | 2/1998 | Tarpill . |

OTHER PUBLICATIONS

Ideal, Wire and Cable Strippers/Cutters–Hand Type.
Jensen Tools, Inc., Xcelite.
Specialized Products Company, Xcelite, Coaxial Wire Strippers.
Techni–Tool, Strippers.
Viewsonics, One Step Coax Cable Stripper, Model VSCST–1.
Viewsonics, Universal Cable Stripper, Model VSCST–Z.

* cited by examiner

Primary Examiner—James G. Smith
Assistant Examiner—Hadi Shakeri
(74) Attorney, Agent, or Firm—DeLio & Peterson, LLC

(57) ABSTRACT

A handheld coaxial cable trimmer tool has a removable and replaceable blade cartridge. The blade cartridge snaps into the tool with a hook engagement and is easily removed from the tool by pressing on a flexible lever on the top of the tool. The flexible lever has limited motion to protect it and the cartridge from being overstressed.

17 Claims, 2 Drawing Sheets

SINGLE DROP TRIMMER WITH LIMITED CARTRIDGE RELEASE

This is a continuation-in-part of application(s) Ser. No. 09/265,437 filed on Mar. 9, 1999 now U.S. Pat. No. 6,128,976.

BACKGROUND OF THE INVENTION

1. Field of the Invention

This invention relates to tools used to remove the insulation from around the inner and outer conductors of a coaxial cable prior to attaching a connector to the end of the cable. More specifically, the invention relates to coaxial cable trimmers, with removable and interchangeable blade assemblies and cable holders, which can be used to strip the insulation from different types and sizes of coaxial cable.

2. Description of Related Art

Coaxial cables are widely used to distribute a variety of high frequency signals, such as video signals and data communications, to multiple reception points. Coaxial cables are comprised of an inner conductor, such as a copper wire, surrounded by an inner layer of insulation and an outer conductor, such as a conductive wire braid or foil, surrounded by an outer layer of insulation. To install a connector on a cable, it is necessary to expose a desired length of the two conductors by removing the surrounding layers. This involves making two cuts at different points on the cable. A first cut is made through the outer insulation to a depth just less than the depth of the diameter of the outer conductor. A second cut is then made through the outer insulation, and through the inner layer of insulation to a depth of just less than the depth of the inner conductor. The pieces of insulation released by the two cuts are pulled off the end of the cable before the coaxial connector is applied.

The distance of each cut from the end of the coaxial cable and the depth of each cut is specified by the type of connector and cable. Each type of coaxial cable connector has a specific requirement for the distance between the end of the cable and the two cuts described above. Since coaxial cables come in a variety of different sizes with different outside diameters, insulation thickness and conductor diameters, the depth of the cut will vary with the specific type of cable and connector used.

To keep up with the increasing complexity and uses of high frequency cabling systems, many installations require the use of multiple types of coaxial cable and connectors to carry all of the needed high frequency signals. Accordingly, the installer must have the tools necessary to make the proper cuts in each cable and connector combination. For an installation requiring more than one type of coaxial cable and connector, the installer will require a cable cutter for each type of cable and connector. Alternatively, the installer could make use of a coaxial cable cutter having an adjustable or replaceable blade assembly. For example, U.S. Pat. No. 5,036,734 discloses a coaxial cable stripping tool having a replaceable jaw cartridge containing stripping blades. While a cutter with a replaceable blade assembly may reduce the number of cutting tools required, they are inconvenient to use due to the tools and time required to change the blade assembly. For instance, in U.S. Pat. No. 5,036,734, the replaceable jaw cartridge is releasably retained by the means of a threaded fastener extending transversely through the blade cartridge, or alternatively, by means of a snap engagement within the handle. U.S. Pat. No. 5,713,150 discloses a coaxial cable trimmer having two removable cutting cartridges where each cartridge slides into a dovetail connection where a resilient hook engages a lip. In order to release the cartridge the user must insert a finger into an opening in the top of the tool to access the hook. Thus, while current coaxial cable cutters with replaceable blade assemblies reduce the number of tools required, these tools are cumbersome to use and operate.

Additionally, cable cutting tools need to provide a mechanism which holds the cable in place while the cable is being cut and is capable of adapting to cables of varying diameters. Generally, cable cutters, including those with replaceable blade assemblies, utilize a cable clamp or holder to position and hold the cable in place, which is not adjustable for varying cable diameters. For example, in U.S. Pat. No. 5,036,734, the cable clamping means is a groove formed in the clamping jaw. In U.S. Pat. No. 5,713,150, each of the two jaw sets has a different size notch, one for a larger diameter cable and the other for a smaller cable. While this approach is functional, it does not provide for accurate positioning of the cable relative to the cutter without further user intervention. Thus, adjusting and positioning the cable in the holder can become time consuming and difficult as the size of the cable varies relative to the design size of the cable holding and positioning means. With existing tools, when a cable has a diameter larger or smaller than the size of the cable holder, the cable installer must use extra care to properly and accurately position the cable in the tool before making a cut.

Bearing in mind the problems and deficiencies of the prior art, it is therefore an object of the present invention to provide a coaxial cable cutter having an easily removable and rapidly replaceable blade assembly.

It is another object of the present invention to provide a coaxial cable cutter where the replaceable blade assembly and the tool cannot be damaged if excess force is applied to release the blade assembly.

It is still another object of the present invention to provide a coaxial cable cutter having an easily removable and replaceable cable holder to accurately position and hold the cable to be cut.

It is an additional object of the invention to provide a coaxial cable cutter having a blade assembly which can be easily removed and replaced without the need for additional tools.

A further object of the invention is to provide a coaxial cable cutter which is easily adapted to be used with cables of varying type and size.

It is yet another object of the present invention to provide a coaxial cable cutter having matching pairs of replaceable blade assemblies and cable holders.

Still other objects and advantages of the invention will in part be obvious and will in part be apparent from the specification.

SUMMARY OF THE INVENTION

The above and other objects, which will be apparent to those skilled in the art, are achieved in the present invention which is directed to a tool for stripping insulation from a cable or wire with removable and interchangeable blade assemblies and cable holders for making insulation removing cuts in coaxial cable. The tool includes a first and second jaw member pivoted together about a pivotal connection between them to form a jaw set which is capable of pivoting between an open and closed position. The first jaw member includes a replaceable blade cartridge having cutting blades mounted within it. A resilient member is preferably integrally formed in the first jaw member and is used to release the replaceable blade cartridge from the first jaw member. A stop surface limits motion of the resilient member. A shaped support is mounted in the second jaw member and is used to hold the coaxial cable in position while the cable is being cut and stripped.

The resilient member includes a projection extending into the interior of the tool towards a resilient hook mounted to the cartridge. The resilient hook is adapted to release the cartridge from the tool when the projection makes contact with the hook. In the most preferred design, the resilient member is a flexible lever which moves downward under finger pressure and causes the projection to contact the hook and release the cartridge. The stop acts to prevent the resilient member or the hook from being flexed beyond a maximum deformation limit.

In the most highly preferred design, the moving portion of the flexible lever is raised slightly above the surface of the first jaw member in the form of a protruding button and is positioned so as to enable the user's thumb or fingers to comfortably contact and press on the protrusion when the tool is held in the user's hand. A latch projection is located within the interior of the tool and the stop surface is formed as an upper surface of the latch projection. A perpendicular front surface of the latch projection acts to engage the hook on the cartridge and the projection contacts the hook to release the hook from engagement with the front surface of the latch projection.

Preferably, the second jaw member includes a substantially square socket mounted opposite the cartridge. The cartridge should be adapted to receive a removable support insert which has an open recess on its face opposite the cartridge to hold the cable in position. The recess is preferably a truncated V-shaped notch, which is sized to correspond to the type of cable or wire to be and to match the cartridge selected. In the preferred design, the insert snaps into the socket and is held in place without separate fasteners.

A pivot extends through the body of the tool and holds the first and second jaw members together. The pivot has a first and second member with end caps. The first and second pivot members are designed to fit together, such that when assembled, the end caps are spaced apart the distance corresponding to the exact distance required to hold the first and second jaw members securely together while allowing the first and second jaw members to pivot freely about the pivot.

A bias means, such as a spring, is preferably mounted between the first and second jaw members, and urges the jaw set into the closed position.

Also in the preferred design, a tube is integrally formed at the end of the first jaw opposite the cartridge and is used to rotate the tool about the cable.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(s)

Figure 1:
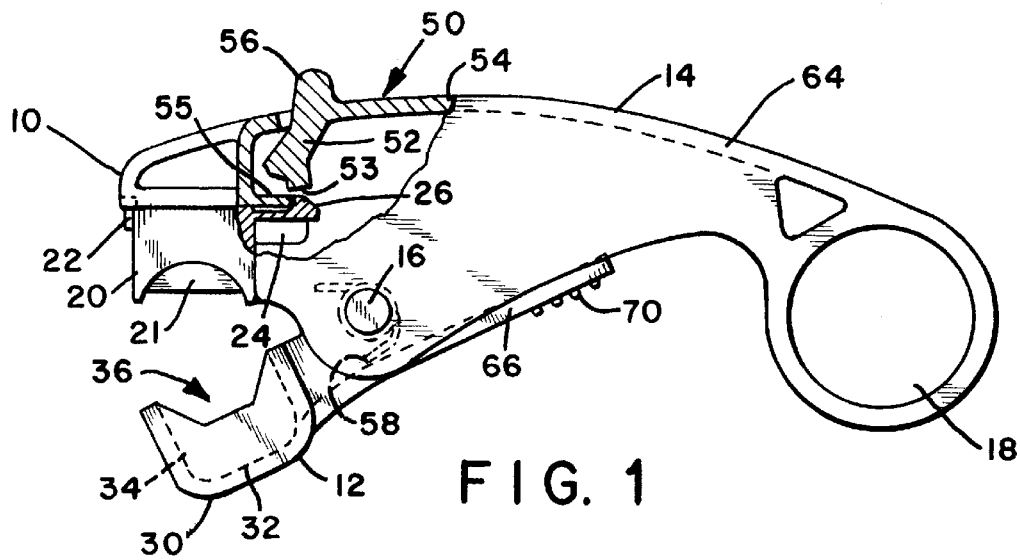
FIG. 1 is a left side elevational view of the present invention showing the first and second jaws of the tool in the open position, with a partial cross section cut-out showing the resilient member, projection, retaining tongue and resilient hook.

In describing the preferred embodiment of the present invention, reference will be made herein to FIGS. 1–6 of the drawings in which like numerals refer to like features of the invention. Features of the invention are not necessarily shown to scale in the drawings.

Referring to the drawings, and in particular to FIG. 1, the preferred embodiment of the invention comprises a first jaw member 10 pivotally connected to a second jaw member 12 by pivot 16. The first jaw member 10 and the second jaw member 12 form a jaw set which opens and closes as the first member 10 and second member 12 are pivoted about pivot 16.

First jaw member 10 includes replaceable blade cartridge 20 containing blades 21 connected thereto at one end, and finger tube 18 integrally formed in first jaw member 10 at the opposite end.

The second jaw member 12 includes a shaped support 30 opposite blade cartridge 20 at one end, and a means to grip second member 12 at its opposite end.

Figure 2:
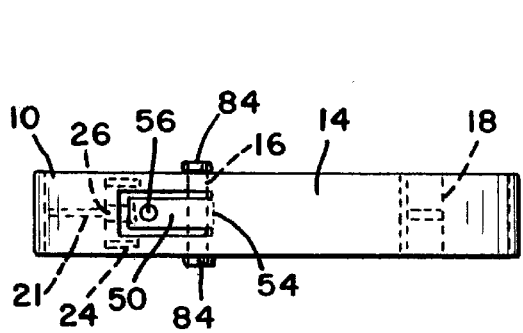
FIG. 2 is a top plan view of the tool at a reduced scale as compared to FIG. 1 and without the partial cross section cut-out showing the first jaw and resilient member.

Resilient member 50 is located on the top surface 14 of first jaw member 10, proximal to blade cartridge 20. Resilient member 50 pivots about a fixed point 54 on the top surface 14 of first jaw member 10. The opposite end 56 of resilient member 50 is adapted to move when finger pressure is applied to it. In the preferred embodiment, the resilient member 50 is integrally formed in the top surface 14 of the first jaw member 10, as shown in FIG. 2. In the most preferred embodiment, end 56 of the resilient member 50 has a slight projection in the form of a button, which allows the user to feel end 56 and apply finger pressure to the exact point on resilient member 50 in order to release the blade cartridge 20. Resilient member 50 has a projection 52 which extends into the interior of the tool towards resilient hook 26 for releasing replaceable blade cartridge 20.

Figure 6:
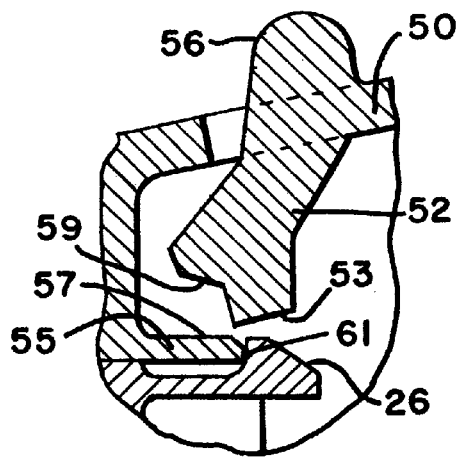
FIG. 6 is a left side partial cross sectional view at an enlarged scale of the cutout portion in FIG. 1 showing the blade cartridge hook and the mechanism for controllably releasing the blade cartridge from the tool.

Referring to FIGS. 1 and 6, it can be seen that projection 52 has a release surface 53 at its end which contacts resilient hook 26 when resilient member 50 is pressed to release the blade cartridge 20. Although replaceable cartridge 20 of FIG. 1 can be connected to first jaw member 10 by any suitable snap means, in the preferred embodiment, replaceable cartridge 20 is mounted to first jaw 10 by means of a dovetail-shaped connecting piece 22 on one side of cartridge 20 and a retaining tongue 24 on the other side of cartridge 20 as shown in FIG. 1.

The first jaw member 10 includes a second projection 55 within the interior of the tool that projects rearwardly. The upper surface of projection 55 forms a stop surface 57 that cooperates with a second stop surface 59 to limit downward motion of the resilient member 50 and the resilient hook 26.

Figure 5:
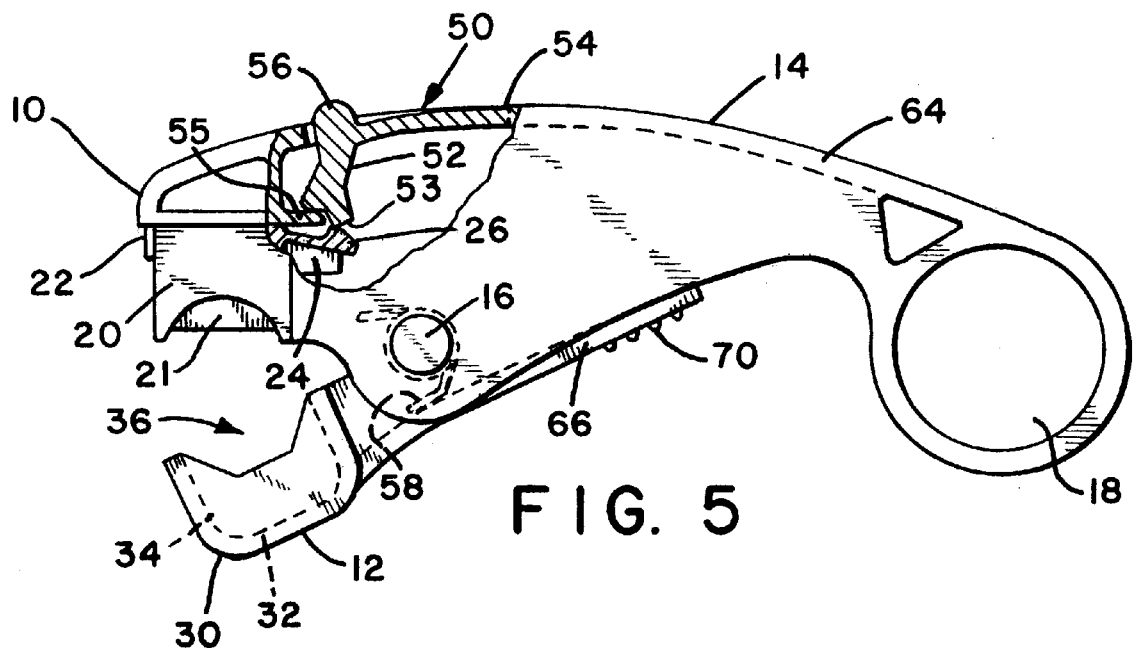
FIG. 5 is a left side elevational view of the present invention corresponding to FIG. 1 showing the resilient member fully depressed against the stop surface releasing the resilient hook on the blade cartridge.

This limiting action is illustrated in FIG. 5, showing the resilient member 50 fully depressed to release the hook 26. The limiting action of stop surfaces 57 59 protect both the resilient member 50 and the resilient hook 26 from being overstressed or damaged due to excessive force applied to the button at end 56 of projection 50.

In the preferred design, both the resilient member 50 and the resilient hook 26 are formed of plastic. Flexing elements of this kind have a maximum deformation limit beyond which they may be damaged. The stop surfaces 57, 59 cooperate to keep the maximum deflection of the resilient member 50 and the resilient hook 26 within safe limits. The first stop surface is rigidly attached to the first jaw member 10 and directly contacts and limits the motion of the projection 52, as shown. This indirectly limits the maximum deflection of the resilient hook as well. However, the first stop surface may alternatively be positioned under the resilient hook 26 so that it directly contacts and limits the motion of the resilient hook and indirectly limits motion of the resilient member. Another possible arrangement is to position the first stop surface under a portion of the resilient member 50 to directly limit the motion of the resilient member.

In the most highly preferred design, the front surface 61 of projection 55 acts to engage the resilient hook 26, forming a latch projection to latch the blade cartridge in position. Front surface 61 is approximately perpendicular to the first stop surface 55 on the upper surface of the latch projection 55.

Resilient hook 26 snaps into position around the latch projection 55 to hold cartridge 20 in first jaw 10. Cartridge 20 is released when pressure is applied to resilient hook 26 with the release surface 53 on projection 52. Resilient member 50 is free to move downward when finger pressure is applied to button end 56 so that projection 52 contacts resilient hook 26 and disengages cartridge 20 from the first jaw member 10.

The second jaw member 12 includes a shaped support 30 comprised of substantially square socket 32 mounted in second jaw 12 opposite replaceable blade assembly 20. Substantially square socket 32 is adapted to receive a removable support insert 34. Support insert 34 has open recess 36 on its face opposite blade cartridge 20 which holds and positions in place the cable to be cut when the jaw set is closed. Open recess 36 may be a truncated V-shaped notch having a depth which corresponds to the particular diameter of cable to be cut and matches the replaceable blade cartridge 20 selected. Support insert 34 can be removed and replaced with another support insert which corresponds to the size of the cable to be cut and matches replaceable cartridge 20. The truncated V-shaped notch is adapted so that in normal use, an appropriately sized cable will contact recess 36 in three places, its base and two sides which extend upward from the base at an angle to the base. Larger cables will contact recess 36 on the two sides. 20 Support insert 34 snaps into substantially square socket 32 without additional fasteners and can be removed by sliding support insert 34 out of socket 32 in a direction substantially parallel to pivotal axis 16.

Figure 4:
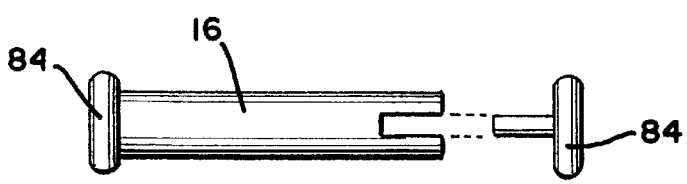
FIG. 4 is a side elevational view of the pivot pin.

First jaw member 10 is pivotally connected to second jaw member 12 by pivot pin 16. As shown in FIG. 4, pivot pin 16 is preferably a 2-piece pivot pin extending through the body of the tool and includes end caps 84. In the preferred design, pivot pin 16 is constructed so that when the two pieces of pivot pin 16 are inserted into the body of the tool and fitted together, end caps 84 accurately hold first jaw member 10 and second jaw member 12 together, while allowing jaw members 10 and 12 to pivot freely about pivot pin 16. As shown in FIG. 2, when pivot pin 16 is assembled, end caps 84 abut the outer surfaces of first jaw member 10. In the most preferred embodiment, pivot pin 16 is a two piece friction fit pivot pin assembly with end caps 84, and is designed so that when the two pieces of pivot pin 16 are compress fitted together, end caps 84 are spaced apart the exact distance required to hold jaw members 10 and 12 securely together, while allowing free pivot motion of the jaw set. Pivot pin 16 is designed so that it cannot be compressed to cause the distance between end caps 84 to be less than that distance required to hold first and second jaw members 10 and 12 securely together and still allow free and unobstructed motion of the jaw set about the pivot 16.

First jaw member 10 and second jaw member 12 are biased into the closed position by a biasing means 58 such as a spring. The biasing means can be any suitable means of biasing jaws 10, 12, in the closed position and may be located between the first and second jaws 10, 12.

In use, the cable cutter is gripped along the outer surfaces of the first and second members 10, 12. As shown in FIG. 1, a first arm 64 is formed along first jaw member between blade cartridge 20 at one end and finger tube 18 at the opposite end. A second arm 66 extends from shaped support 30 of second jaw member 12 in a direction perpendicular to pivot axis 16. Arm 66 may contain a patterned surface or series of protrusions 70 on its outer surface enabling the user to accurately position his fingers on the arm 66 without having to visualize his hand position on the tool. When first and second arms 64, 66 are gripped and pressed, biasing means 58 is compressed and second member 12 pivots inside first member around the pivot axis 16. This opens the jaw set as seen in FIG. 1, and allows the insertion of a coaxial cable between blade cartridge 20 and support insert 34. When first and second members 10, 12 are released, the blades in blade cartridge 20 are pressed against the cable and the cable is accurately positioned and securely held in the truncated V-shaped notch 36 in support insert 34.

In the preferred embodiment, the tool may be held with the thumb principally resting near resilient member 50 with the remaining fingers pressing against pattern 70 on arm 66. The thumb of the user is then free to exert pressure on the button end 56 of resilient member 50, thereby releasing blade assembly 20 from first member 10.

Figure 3:
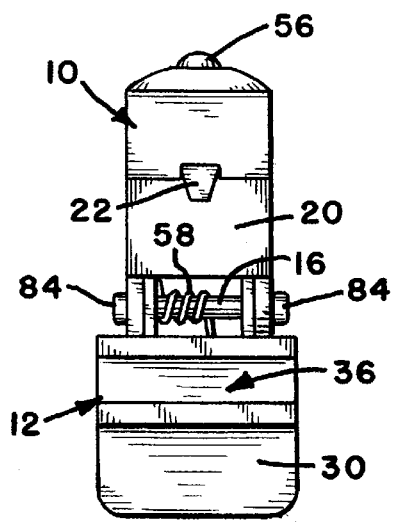
FIG. 3 is a front view of the tool.

When arms 64, 66 of first and second members 10, 12 are released, bias means 58, shown in FIG. 3, provides sufficient force to initiate the cuts in the coaxial cable. The cable is then held with one hand so that it does not turn and the tool is rotated one or more times around the circumference of the cable to make the insulation removing cuts. To assist in making the cuts and rotating the cutter, finger tube 18 is provided mounted to first jaw member 10, distal blade assembly 20. The index finger may be conveniently inserted into finger tube 18 to allow the tool to be rotated around the circumference of the cable. After the cuts are made around the entire perimeter of the cable, the cable can be withdrawn without opening the jaws to pull the scrap insulation off the end of the cable.

The integral assemblies may be constructed at low cost, preferably by injection molding or the like, and are quickly and easily assembled by simply snapping the components together. Snap-in dovetail connections allow the replaceable blade cartridge 20 to be snapped firmly into position in the first jaw member 10.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A tool for stripping insulation from a cable or wire comprising:
   a first jaw member;
   a second jaw member connected to said first jaw member by a pivot to form a jaw set, the first jaw member and second jaw member being movable with respect to each other about the pivot between an open position and a closed position;
   a replaceable blade cartridge mounted in said first jaw member, said blade cartridge having cutting blades mounted therein;
   a resilient member mounted to said first jaw member for releasing said cartridge from the first jaw member;
   a first stop surface for limiting motion of the resilient member; and
   a shaped support mounted in the second jaw member opposite said cartridge, said shaped support being adapted to receive and hold the cable or wire to be stripped.

2. The tool of claim 1, wherein said resilient member includes a projection extending into the interior of the tool towards a resilient hook mounted to said cartridge, said resilient hook being adapted to release said cartridge from the tool when pressure is applied to said hook, said resilient member being free to move downward under finger pressure on the resilient member such that said projection contacts the hook and releases the cartridge from the tool.

3. The tool of claim 2, wherein said projection includes a second stop surface, he second stop surface contacting the first stop surface to limit motion of the resilient member.

4. The tool of claim 3, wherein said first stop surface is located within the interior of the tool, proximate the hook.

5. The tool of claim 4, further including a latch projection located within the interior of the tool, the first stop surface comprising an upper surface of the latch projection and a perpendicular surface of the latch projection acting to engage the hook.

6. The tool of claim 2, wherein said resilient member comprises a flexible lever arm, said lever arm having one end fixed on a surface of the first jaw member and the other end adapted to move under finger pressure.

7. The tool of claim 6, wherein said moving portion of said lever arm is located on the surface of the tool, such that when the tool is gripped or held in the user's hand, the user's thumb or fingers easily contacts the arm.

8. The tool of claim 6, wherein said lever arm is integrally formed on the top surface of the first jaw member.

9. The tool of claim 1, wherein said shaped support comprises a substantially square socket mounted in said second jaw opposite said cartridge, said socket being adapted to receive a removable support insert, said insert having an open recess on its face opposing said cartridge, said recess adapted to receive and hold in place the cable or wire to be stripped when the jaw set is closed, said insert adapted to be removed from said socket and replaced with another insert to accommodate cables of various diameters and match the cartridge selected.

10. The tool of claim 9, wherein said insert snaps into said socket and is secured therein without separate fasteners.

11. The tool of claim 1, wherein said pivot comprises a first and second pivot member and includes an end cap on each pivot member, said first and second pivot members designed to be assembled and connected together, such that when assembled, said end caps are spaced apart a distance corresponding to the exact distance required to hold said first and second jaw members securely together and allow said first and second jaw members to pivot freely about said pivot.

12. The tool of claim 1 further comprising a bias means for urging said jaw set into the closed position.

13. The tool of claim 12, wherein said bias means is a spring.

14. The tool of claim 1, further comprising a tube mounted on the first jaw member distal said cartridge for rotating the tool about the cable or wire.

15. The tool of claim 11, wherein said tube is integrally formed in the first jaw member.

16. The tool of claim 1, wherein the resilient member has a maximum deformation limit beyond which the resilient member is damaged and the stop surface limits motion of the resilient member to less than the maximum deformation limit.

17. The tool of claim 1, wherein the blade cartridge includes a resilient hook adapted to release the blade cartridge from the tool when pressure is applied to the resilient hook, the resilient hook having a maximum deformation limit beyond which the resilient hook is damaged, and wherein the stop surface limits motion of the resilient member to limit motion of the resilient hook to less than the maximum deformation limit for the resilient hook.

* * * * *

UNITED STATES PATENT AND TRADEMARK OFFICE
CERTIFICATE OF CORRECTION

PATENT NO.   : 6,253,641 B1
DATED        : July 3, 2001
INVENTOR(S)  : Andrew J. Tarpill It is certified that error appears in the above-identified patent and that said Letters Patent is hereby corrected as shown below:

<u>Column 5,</u>
Line 3, delete "57 59" and substitute therefor -- 57, 59 --.

<u>Column 8, claim 7,</u>
Line 2, between "contacts the" and "arm" insert therefor -- moving portion of said lever --.

Signed and Sealed this

Ninth Day of April, 2002

Attest:

JAMES E. ROGAN
*Attesting Officer*     *Director of the United States Patent and Trademark Office*